(12) United States Patent  
Sairanen (10) Patent No.: US 8,031,714 B2  
(45) Date of Patent: Oct. 4, 2011

(54) USING A CACHE OF OUTGOING PACKET IDENTIFIERS TO RECOVER FROM A PROTOCOL ERROR IN GTP-U

(75) Inventor: Jussi-Pekka Sairanen, Saratoga, CA (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 245 days.

(21) Appl. No.: 12/511,673

(22) Filed: Jul. 29, 2009

(65) Prior Publication Data

US 2010/0103935 A1 Apr. 29, 2010

Related U.S. Application Data

(60) Provisional application No. 61/105,511, filed on Oct. 15, 2008.

(51) Int. Cl.
 *H04L 12/28* (2006.01)
(52) U.S. Cl. ........................ 370/392; 370/402
(58) Field of Classification Search .................. None
 See application file for complete search history.

(56) References Cited

U.S. PATENT DOCUMENTS

| | | | | |
|---|---|---|---|---|
| 2004/0246962 | A1* | 12/2004 | Kopeikin et al. | 370/392 |
| 2007/0178916 | A1* | 8/2007 | Sorbara et al. | 455/458 |
| 2008/0165725 | A1* | 7/2008 | Huomo et al. | 370/328 |
| 2008/0186912 | A1* | 8/2008 | Huomo | 370/329 |
| 2008/0192925 | A1* | 8/2008 | Sachs et al. | 380/29 |
| 2008/0259873 | A1* | 10/2008 | Ahmavaara et al. | 370/331 |
| 2009/0116513 | A1* | 5/2009 | Gray et al. | 370/475 |
| 2010/0322068 | A1* | 12/2010 | Grahn et al. | 370/217 |

OTHER PUBLICATIONS

"3rd Generation Partnership Project; Technical Specification Group Core Network and Terminals; General Packet Radio Service (GPRS); GPRS Tunnelling Protocol (GTP) across the Gn and Gp interface (Release 8)", 3GPP Draft; 29060-820 3rd Generation Partnership Project (3GPP), Mobile Competence Centre, 650, Route Des Lucioles; F-06921 Sophia-Antipolis Cedex ; France, vol. CT WG4, Dec. 20, 2007, pp. 1-143.

(Continued)

*Primary Examiner* — Phirin Sam
(74) *Attorney, Agent, or Firm* — Staas & Halsey LLP (57) ABSTRACT

A process of using a cache of outgoing packet identifiers to recover from a protocol error includes assigning a receive identifier associated with a user entity to a traffic stream at a receive node. The receive identifier is sent to a transmit node. The transmit node is instructed to associate the receive identifier with a receive plurality of data packets of the traffic stream. The transmit identifier associated with the user entity is assigned to the traffic stream at the transmit node. The transmit node identifier, the receive node identifier, and the address of the receive node are stored in a transmit cache at the transmit node for each of the receive plurality of data packets. The receive plurality of data packets is sent from the transmit node to the receive node. An error message is received at the transmit node from the receive node, indicating that the receive identifier was not recognized. The transmit cache is searched for the transmit node identifier using the receive node identifier and the address of the receive node. The user entity associated with the transmit node identifier is identified, and the user entity is removed.

12 Claims, 5 Drawing Sheets

OTHER PUBLICATIONS

"Digital cellular telecommunications system (Phase 2+); Universal Mobile Telecommunications System (UMTS); General Packet Radio Service (GPRS); Service description; Stage 2 (3GPP TS 23.060 version 7.7.0 Release); ETSI TS 123 060" ETSI Standard, European Telecommunications Standards Institute (ETSI), SophiaAntipolis Cedex, France, vol. 3-SA2, No. V7.7.0, Jun. 1, 2008, pp. 1-219.

"Technical Specification Group Core Network and Terminals; 3GPP Evolved Packet System; Evolved GPRS Tunnelling Protocol for EPS (GTPv2); Stage 3 (Release 8), 3GPP TS 29.274 V1.1.0" 3rd Generation Partnership Project, [Online] Jul. 2008, pp. 1-76, Retrieved from the Internet: URL:http//www.3gpp.org/ftp/Specs/archive/29-series/29.274/29274-110.zip>.

"Technical specification Group Core Network and Terminal; GPRS Tunnelling Protocol User Plane (GTPv1-U) (Release 8), 3GPP TS 29.281 V1.0.1" 3rd Generation Partnership Project, [Online] Sep. 2008, pp. 1-19, Retrieved from the Internet: URL:http://www.3gpp.org/ftp/Specs/archive/29_series/29.281/29281-101.zip>.

European Search Report dated Feb. 26, 2010 and issued in corresponding European Patent Application 09173179.4.

* cited by examiner

USING A CACHE OF OUTGOING PACKET IDENTIFIERS TO RECOVER FROM A PROTOCOL ERROR IN GTP-U

CROSS-REFERENCE TO RELATED APPLICATIONS

This application is related to and claims the benefit of priority to U.S. Provisional Application Ser. No. 61/105,511 entitled, "USING A CACHE OF OUTGOING PACKET IDENTIFIERS TO RECOVER FROM A PROTOCOL ERROR IN GTP-U", by Jussi-Pekka Sairanen, filed Oct. 15, 2008 in the United States Patent and Trademark Office, the disclosures of which are incorporated herein by reference.

BACKGROUND OF THE INVENTION

1. Field of the Invention

The invention relates to recovery of protocol errors in GTP-u.

2. Description of the Related Art

A tunneling protocol is a network protocol which encapsulates a payload protocol, while acting as a payload protocol. A tunneling protocol may be used for various reasons, including carrying a payload over an incompatible delivery network, or to provide a secure path through an untrusted network.

A typical user plane data traffic tunneling mechanism involves three phases: constructing the tunnel, maintaining the tunnel and gracefully bringing the tunnel down. Normally there are two network nodes involved—the tunnel endpoints.

Construction of a tunnel usually involves an exchange of client data between the tunnel endpoints. The tunnel endpoints may be constructed by, for example, network gateways. Both of the network gateways involved in building the tunnel need to create a data entity for maintaining the tunnel. This entity, which is known as a PDP Context in GPRS Tunneling Protocol (GTP), contains information about, for example, user mobility, charging, authentication, Quality of Service, etc. Each user plane data packet that arrives through the tunnel into the tunnel endpoint node needs to be associated with one such entity. Each tunnel protocol packet contains an identifier, called a Tunnel Endpoint Identifier (TEID) to make that possible. The TEID helps the tunnel endpoint node detect the correct User Entity associated with the stream of data packets belonging to one particular user.

One network tunnel endpoint node may hold millions of tunnel endpoints at any given time. Every incoming user plane data packet needs to be quickly associated with a correct User Entity. To that end, tunneling protocols often involve a tunneling initialization stage in which each of the tunnel endpoint nodes allocate an identifier for each user traffic stream. Each of the tunnel endpoint nodes then instructs the other endpoint node to include that identifier in every data packet related to a particular user plane data packet stream.

Figure 1:
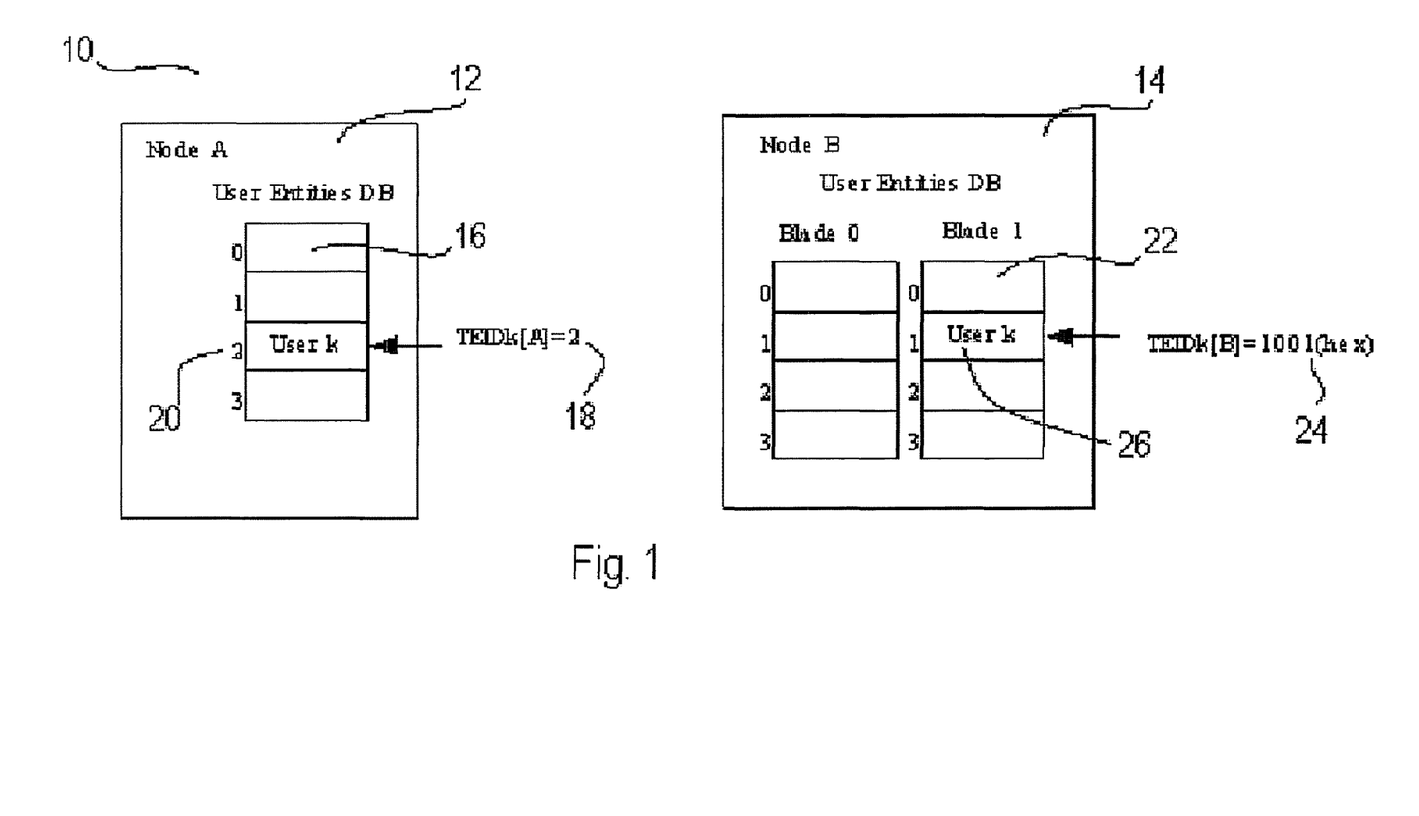
FIG. 1 is an example of Tunnel Endpoint Identifier (TEID) allocation methods for use with an embodiment of the invention.

The composition of the TEID may be implementation specific. The TEID may be comprised of, for example, a processing blade number or a position of a User Entity in a table of User Entities. As shown in FIG. 1, for example, user k, which is in position 2 (reference 20) of a User Entities Database (DB) 16 at Node A (reference 12), is assigned a TEID of 2 (reference 18) by Node A (reference 12). At Node B (reference 14), on the other hand, user k is assigned a TEID equal to its processing plate number, or 1001(hex) (reference 24), by Node B (reference 14).

An identifier allocated to a traffic stream by one of the network nodes is just an arbitrary number to the other network node. If each of the tunnel end nodes includes the identifier allocated by the tunnel end node in each and every data packet, however, both of the tunnel end nodes will be able to associate a user plane packet with its owner quickly.

Figure 2:
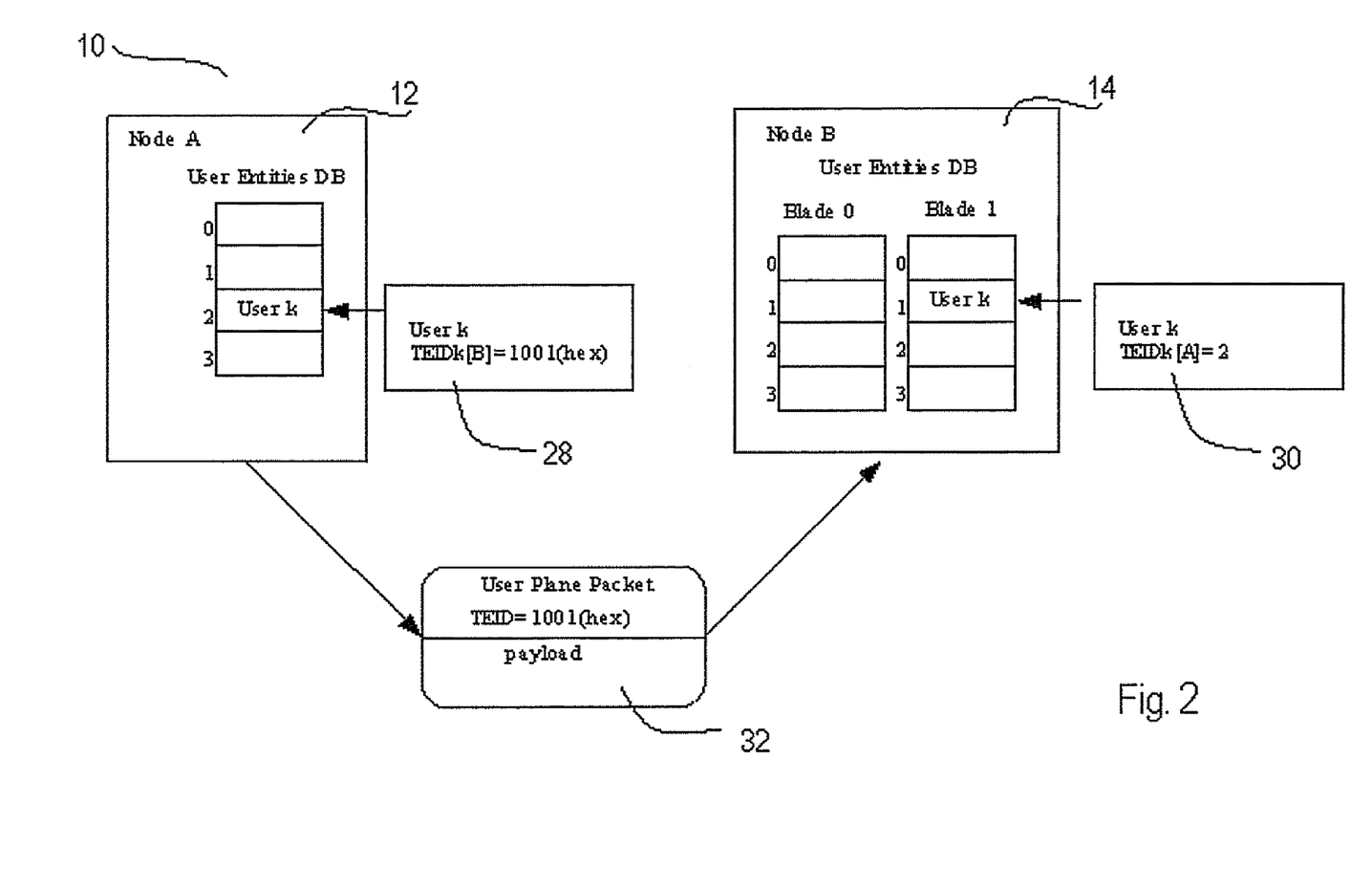
FIG. 2 is an example of a User plane packet with TEID allocated by the receiver for use with an embodiment of the invention.

As shown in FIG. 2, for example, Node A (reference 12) stores the TEID of 1001(hex) (reference 28) assigned to user k by Node B (reference 14). Node B (reference 14), similarly, stores the TEID of 2 (reference 30) assigned to the user k by Node A (reference 12). The User Plane Packet (reference 32) sent by Node A (reference 12) to Node B (reference 14) may be seen to include the TEID of 1001(hex), which was assigned to user k by Node B (reference 14). Consequently, when the User Plane Packet 32 reaches Node B (reference 14), Node B (reference 14) will be able to associate the User Plane Packet 32 with user k quickly and easily.

Maintenance of a tunnel throughout its existence involves constantly verifying that each tunnel endpoint node is up and running. If either of the tunnel endpoint nodes loses the contents of its User Entity database due to, for example software or hardware malfunction, the other tunnel endpoint node must react by removing all the user plane data tunnel endpoints associated with the broken tunnel endpoint node.

Graceful termination of a user plane data tunnel involves an exchange of control messaging initiated by either tunnel endpoint node informing the other tunnel endpoint node that the tunnel is going down. Each tunnel endpoint node will then remove the User Entity from its database and refuse to forward any data packets associated with the terminated tunnel to the other tunnel endpoint node.

A problem arises if there is a disruption in the maintenance protocol of the user plane data tunnel. If one tunnel endpoint node, let's say Node A, removes—or loses—a User Entity database entry but the information of that happening doesn't reach the other one, Node B, Node B may still keep forwarding packets associated with a lost user (let's say user k) to Node A, providing each packet with the Tunnel Endpoint Identifier once allocated by Node A for the user k, i.e. (TEIDk [A]).

Tunnel Endpoint Node A, now having lost user k from its database, recognizes a problem in the tunnel protocol and informs Node B about the failure. Node A notifies Node B by sending an error message—known as Error Indication in GTP-u protocol—to Node B informing Node B of a protocol problem related to the tunnel endpoint identifier TEIDk[A]. When Node B receives the Error Indication, Node B should remove the User Entity it still has involving the User k. However, Node B has no direct mapping of TEIDk[A] to the User Entity Database entry being affected. So far it has relied on Node A using TEIDk[B] in all communication involving user k, but Node A has lost that identifier along with all other information about user k.

A User Entity database Entry contains among other things the address of the other endpoint of the tunnel and the Tunnel Endpoint Identifier the other peer has allocated a particular user. Now having received an Error Indication message from one tunnel endpoint node in address A, Node B can scan through its User Entity database for an entry with a combination of tunnel endpoint node address A/tunnel endpoint identifier TEIDk[A]. This is a linear search and can be fairly time consuming.

As a performance remedy the tunnel endpoint node may maintain a search tree or a hash table in which the key would be a tuple of a tunnel endpoint node address and the remotely allocated TEID. This search structure, however, may become very large and if not carefully maintained may become corrupted over time. Furthermore, there is no inherent self-fixing mechanism for this search structure.

SUMMARY OF THE INVENTION

In an aspect of the invention, a method of using a cache of outgoing packet identifiers to recover from a protocol error includes assigning a first identifier associated with a user entity to a traffic stream at a first node, forwarding the first identifier to a second node, instructing the second node to associate the first identifier with a first plurality of data packets of the traffic stream, storing the first node identifier, the second node identifier, and the address of the first node in a second cache at the second node for each of the first plurality of data packets, sending the first plurality of data packets from the second node to the first node, assigning a second identifier associated with the user entity to the traffic stream at the second node, sending the second identifier to the first node, instructing the first node to associate the second identifier with a second plurality of data packets of the traffic stream, storing the first node identifier, the second node identifier, and the address of the second node in a first cache at the first node for each of the second plurality of data packets, sending the second plurality of data packets from the first node to the second node, receiving an error message from the second node at the first node, indicating that the second identifier was not recognized, searching the first cache for the first node identifier using the second node identifier and the address of the second node, identifying the user entity associated with the first node identifier, and removing the user entity.

In an aspect of the invention, a method of using a cache of outgoing packet identifiers to recover from a protocol error includes assigning a receive identifier associated with a user entity to a traffic stream at a receive node, sending the receive identifier to a transmit node, instructing the transmit node to associate the receive identifier with a receive plurality of data packets of the traffic stream, assigning a transmit identifier associated with the user entity to the traffic stream at the transmit node, storing the transmit node identifier, the receive node identifier, and the address of the receive node in a transmit cache at the transmit node for each of the receive plurality of data packets, sending the receive plurality of data packets from the transmit node to the receive node, receiving an error message at the transmit node from the receive node, indicating that the receive identifier was not recognized, searching the transmit cache for the transmit node identifier using the receive node identifier and the address of the receive node, identifying the user entity associated with the transmit node identifier, and removing the user entity.

The above-described embodiments of the present invention are intended as examples, and all embodiments of the present invention are not limited to including the features described above.

DETAILED DESCRIPTION OF THE PREFERRED EMBODIMENTS

Reference may now be made in detail to embodiments of the present invention, examples of which are illustrated in the accompanying drawings, wherein like reference numerals refer to like elements throughout.

Figure 3:
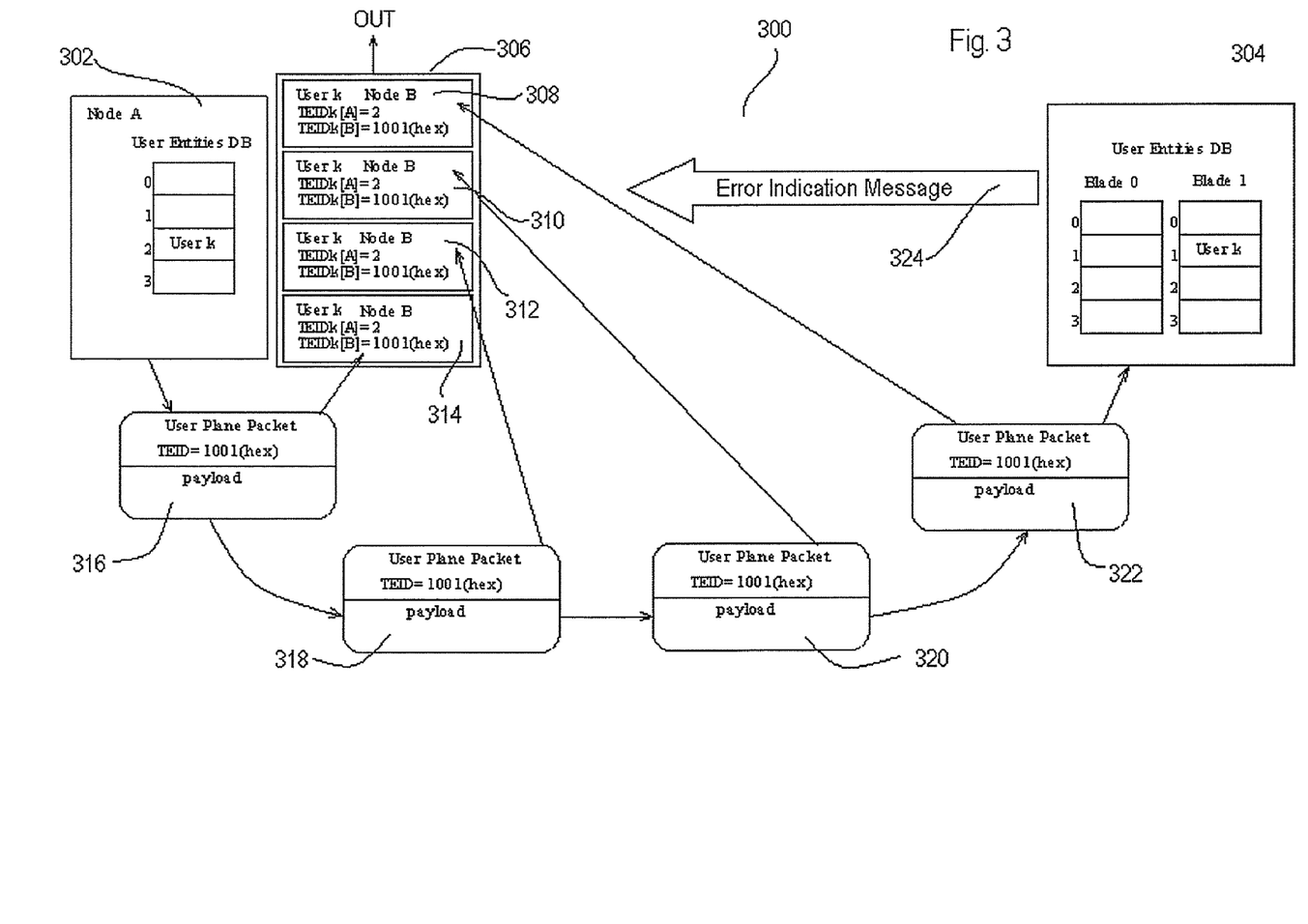
FIG. 3 is a tunneling process in which a cache of outgoing packet identifiers is used to recover from a protocol error according to an embodiment of the invention.

In FIG. 3 is shown a tunneling process 300 in which a cache 306 of outgoing packet identifiers is used to recover from a protocol error. As may be seen in FIG. 3, a tunnel endpoint node 302 is forwarding a plurality of user plane data packets 316, 318, 320, and 322 to a tunnel endpoint node 304. The plurality of user plane data packets 316, 318, 320, and 322 may belong to, for example, a user k. While only one direction of user plane data packet transmission is shown in FIG. 3 for purposes of clarity, a substantially symmetrical process may be conducted at the tunnel endpoint node 304 for user plane data packets being forwarded to the tunnel endpoint node 302.

A transmission information set is created for each of the user plane data packets 316, 318, 320, and 322 as they are being transmitted. The transmission information set would then be cached into the cache 306, a limited length, first-in-first-out queue of similar information sets. In one embodiment, the cache 306 is associated with the tunnel endpoint node 302. In one embodiment, the cache 306 is dedicated to the traffic stream being sent to the tunnel endpoint node 304. In another embodiment, the cache 306 is shared by several tunnel endpoint nodes, each of which is receiving user plane data packets from the tunnel endpoint node 302. In one embodiment, a cache hit ratio could be further improved by introducing a separate cache for each tunneling peer.

In one embodiment, the cache 306 is a first-in-first out cache. In one embodiment, the length of the cache 306, or number of storage places within the cache 306, is optimized to reduce cache miss errors. The cache 306 shown in FIG. 3, for example, has four storage places, but the cache 306 may have more or less storage spaces.

A transmission information set 308, for example, was created for a user plane data packet 322 when it was transmitted. The transmission information set 308 contains the address of the tunnel endpoint node 304 to which user plane data packet 322 is being transmitted, the tunnel endpoint identifier allocated for user k by the tunnel endpoint node 304, i.e., TEIDk [B], and the local identifier for user k, i.e. TEIDk[A]. The transmission information set 308 was cached in the first position of the cache 306, since, in FIG. 3, the user plane data packet 322 was the first user plane data packet to be transmitted. When the cache 306 becomes full, the transmission information set 308 will be removed to make room for a new transmission information set.

A transmission information set 310, similarly, was created for a user plane data packet 320 when it was transmitted. The transmission information set 310 contains the address of the tunnel endpoint node 304 to which user plane data packet 320 is being transmitted, the tunnel endpoint identifier allocated for user k by the tunnel endpoint node 304, i.e., TEIDk[B], and the local identifier for user k, i.e. TEIDk[A]. The transmission information set 310 was cached in the second position of the cache 306, since, in FIG. 3, the user plane data packet 320 was the second user plane data packet to be transmitted. When the cache 306 becomes full, and the transmission information set 308 is removed to make room for a new transmission information set, the transmission information set 310 will move into the first position of the cache 306.

A transmission information set 312, similarly, was created for a user plane data packet 318 when it was transmitted. The transmission information set 312 contains the address of the tunnel endpoint node 304 to which user plane data packet 318 is being transmitted, the tunnel endpoint identifier allocated for user k by the tunnel endpoint node 304, i.e., TEIDk[B], and the local identifier for user k, i.e. TEIDk[A]. The transmission information set 312 was cached in the third position of the cache 306, since, in FIG. 3, the user plane data packet 318 was the third user plane data packet to be transmitted. When the cache 306 becomes full, and the transmission information set 308 is removed to make room for a new transmission information set, the transmission information set 312 will move into the second position of the cache 306.

A transmission information set 314, finally, was created for a user plane data packet 316 when it was transmitted. The transmission information set 314 contains the address of the tunnel endpoint node 304 to which user plane data packet 316 is being transmitted, the tunnel endpoint identifier allocated for user k by the tunnel endpoint node 304, i.e., TEIDk[B], and the local identifier for user k, i.e. TEIDk[A]. The transmission information set 314 was cached in the fourth position of the cache 306, since, in FIG. 3, the user plane data packet 316 was the fourth user plane data packet to be transmitted. When the cache 306 becomes full, and the transmission information set 308 is removed to make room for a new transmission information set, the transmission information set 314 will move into the third position of the cache 306.

If the tunnel endpoint node 304 loses the contents of its User Entity database due to, for example software or hardware malfunction, the tunnel endpoint node 302 must react by removing all the user plane data tunnel endpoints associated with the broken tunnel endpoint node. If the tunnel endpoint node 304 reboots, for example, and loses the tunnel endpoint identifier allocated for user k by the tunnel endpoint node 304, i.e., TEIDk[B], the user plane data packets may not be able to be associated with the user k. In this case, the tunnel endpoint node 304 may send an Error Indication Message 324 to the tunnel endpoint node 302 immediately upon reception of, for example, the user plane data packet 322. The Error Indication Message 324 informs the tunnel endpoint node 302 that the tunnel endpoint identifier associated with the user plane data packet is unrecognized.

There is a good chance that the tunnel endpoint node 302 that sent the user plane data packet 322 still has the transmission information set 308 concerning the user plane data packet 322 in the cache 306. Doing an exhaustive search in the transmission data set cache 306 may find an entry containing a combination of the address of the tunnel endpoint node 304 and the tunnel endpoint identifier allocated for user k by the tunnel endpoint node 304, i.e., TEIDk[B]. In one embodiment, this combination is unique by protocol definition so the third member of the transmission information set, the local identifier for user k, i.e. TEIDk[A], will locate the offending User Entity so it can be removed.

If the transmission information set 308 related to the forwarded user plane data packet 322 that triggered the Error Indication Message 324 has already been overwritten in the cache 306 when the Error Indication Message 324 arrives, the tunnel endpoint node 302 may still have to do an exhaustive search in the User Entity database after all. Still, it is a matter of network node optimization to find a reasonable value—memory and search time consumption wise—for the transmission information set cache 306.

Figure 4:
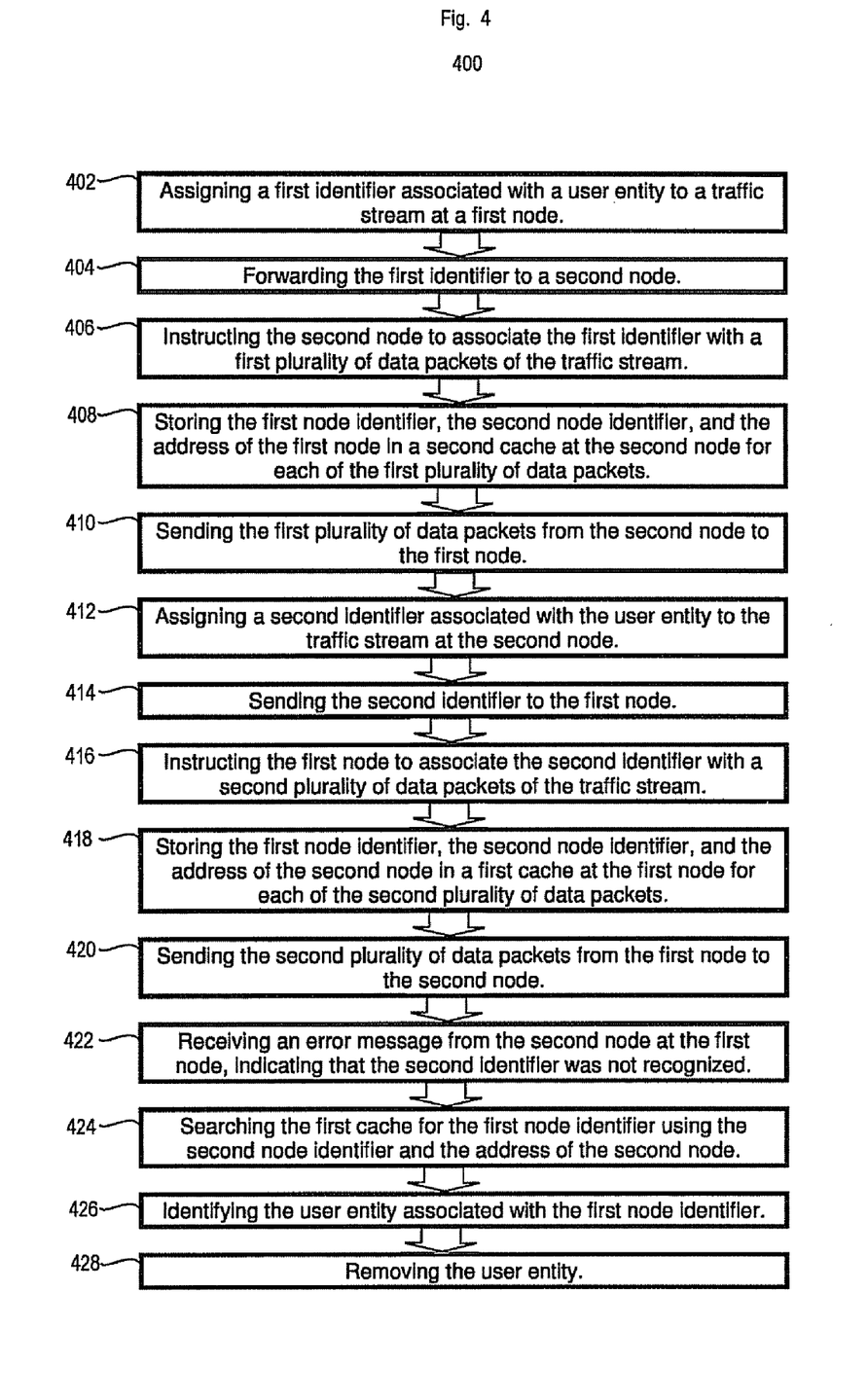
FIG. 4 is a process in which a cache of outgoing packet identifiers is used to recover from a protocol error according to an embodiment of the invention.

In FIG. 4 is shown a process 400 in which a cache of outgoing packet identifiers is used to recover from a protocol error. The process 400 begins with a first operation 402 in which a first identifier associated with a user entity is assigned to a traffic stream at a first node. From the first operation 402 the process moves to a second operation 404, in which the first identifier is forwarded to a second node.

From the second operation 404 the process moves to a third operation 406, in which the second node is instructed to associate the first identifier with a first plurality of data packets of the traffic stream. From the third operation 406, the process moves to a fourth operation 408, in which the first node identifier, the second node identifier, and the address of the first node are stored in a second cache at the second node for each of the first plurality of data packets.

From the fourth operation 408, the process moves to a fifth operation 410, in which the first plurality of data packets are sent from the second node to the first node. From the fifth operation 410, the process moves to a sixth operation 412, in which a second identifier associated with the user entity is assigned to the traffic stream at the second node. From the sixth operation 412, the process moves to a seventh operation 414, in which the second identifier is sent to the first node.

From the seventh operation 414, the process moves to an eighth operation 416, in which the first node is instructed to associate the second identifier with a second plurality of data packets of the traffic stream. From the eighth operation 416, the process moves to a ninth operation 418, in which the first node identifier, the second node identifier, and the address of the second node are stored in a first cache at the first node for each of the second plurality of data packets. From the ninth operation 418, the process moves to a 10th operation 420, in which the second plurality of data packets is sent from the first node to the second node.

From the $10^{th}$ operation 420, the process moves to an 11th operation 422, in which an error message from the second node is received at the first node, indicating that the second identifier was not recognized. From the $11^{th}$ operation 422, the process moves to a $12^{th}$ operation 424, in which the first cache is searched for the first node identifier using the second node identifier and the address of the second node. From the $12^{th}$ operation 424, the process moves to a $13^{th}$ operation 426, in which the user entity associated with the first node identifier is identified. From the $13^{th}$ operation 426, the process moves to a $14^{th}$ operation 428, in which the user entity is removed.

Figure 5:
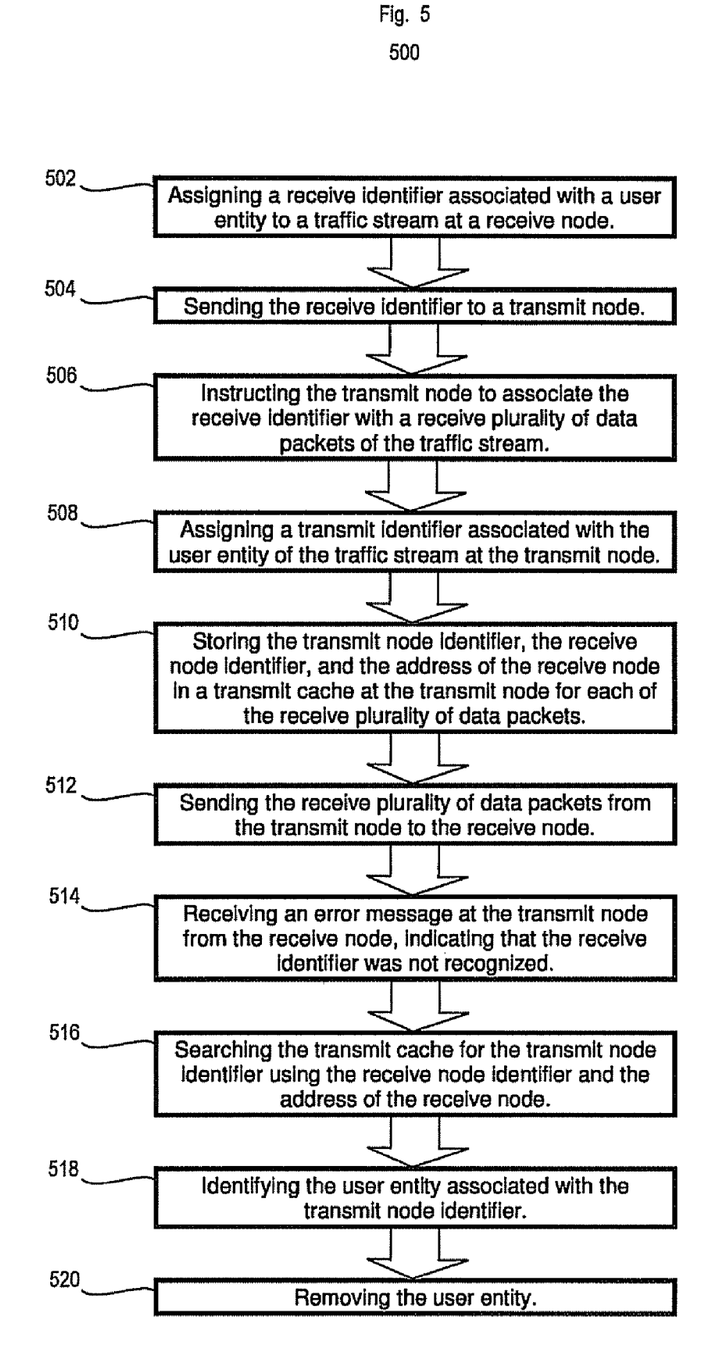
FIG. 5 is a process in which a cache of outgoing packet identifiers is used to recover from a protocol error according to an embodiment of the invention.

In FIG. 5 is shown a process 500 in which a cache of outgoing packet identifiers is used to recover from a protocol error. The process 500 begins with a first operation 502, in which a receive identifier associated with a user entity is assigned to a traffic stream at a receive node. From the first operation 502, the process moves to a second operation 504, in which the receive identifier is sent to a transmit node.

From the second operation 504, the process moves to a third operation 506, in which the transmit node is instructed to associate the receive identifier with a receive plurality of data packets of the traffic stream. From the third operation 506, the process moves to a fourth operation 508, in which a transmit identifier associated with the user entity of the traffic stream is assigned at the transmit node. From the fourth operation 508, the process moves to a fifth operation 510, in which the transmit node identifier, the receive node identifier, and the address of the receive node are stored in a transmit cache at the transmit node for each of the receive plurality of data packets.

From the fifth operation 510, the process moves to a sixth operation 512, in which the receive plurality of data packets are sent from the transmit node to the receive node. From the sixth operation 512, the process moves to a seventh operation 514, in which an error message is received at the transmit node from the receive node, indicating that the receive identifier was not recognized. From the seventh operation 514, the process moves to an eighth operation 516, in which the transmit cache is searched for the transmit node identifier using the receive node identifier and the address of the receive node.

From the eighth operation 516, the process moves to a ninth operation 518, in which the user entity associated with the transmit node identifier is identified. From the ninth operation 518, the process moves to a $10^{th}$ operation 520, in which the user entity is removed.

Here is an example of a tunnel endpoint node's packet transmission and Error Indication reception functions in a C-like pseudo programming language.

```
struct user_entity
{
  teid_t teid_remote;
  teid_t teid_local;
  address_t address_remote;
  [..]
};
struct transmission_set
{
  teid_t teid_remote;
  address_t address_remote;
  struct user_entity *context;
};
struct transmisison_set cache[MAX_SET_ENTRIES];
void forward_data_packet(address_t a, struct user_entity *e,
data_packet_t *pkt)
{
  // add the other peer's allocated tunnel endpoint identifier to the packet.
  prepend(pkt, e->teid_remote);
  send_pkt(a, pkt);
  // push an information set about the transmission in the cache
  struct transmission_set tset={
    .teid_remote =e->teid_remote,
    .context =e,
    .address_remote=e->address_remote
  };
  push(tset, cache);
}
void recv_error_indication(address_t a, teid_t teid_remote)
{
  for(i=0;i<MAX_SET_ENTRIES;i++) {
    if(cache[i].address_remote==a &&
    cache[i].teid_remote==teid_remote) {
      delete_user_entity(cache[i].context);
      return;
    }
  }
  /* if still here the cache lookup failed */
  do_an_exhaustive_search_and_destroy(a, teid_remote);
}
```

The solution suggested here is very simple: avoiding the memory waste of big data structures and maintenance complexities of search trees or hash tables that aim to the same goal—avoiding exhaustive searches in User Entity Database for a malfunctioning User Entity. While a hit in the cache is not always guaranteed, adjusting the cache size to a value that doesn't take too long to search through but provides a good hit ratio should provide a reasonable compromise.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of using a cache of outgoing packet identifiers to recover from a protocol error, comprising:
assigning a first identifier associated with a user entity to a traffic stream at a first node;
forwarding the first identifier to a second node;
instructing the second node to associate the first identifier with a first plurality of data packets of the traffic stream;
storing the first node identifier, the second node identifier, and the address of the first node in a second cache at the second node for each of the first plurality of data packets;
sending the first plurality of data packets from the second node to the first node;
assigning a second identifier associated with the user entity to the traffic stream at the second node;
sending the second identifier to the first node;
instructing the first node to associate the second identifier with a second plurality of data packets of the traffic stream;
storing the first node identifier, the second node identifier, and the address of the second node in a first cache at the first node for each of the second plurality of data packets;
sending the second plurality of data packets from the first node to the second node;
receiving an error message from the second node at the first node, indicating that the second identifier was not recognized;
searching the first cache for the first node identifier using the second node identifier and the address of the second node;
identifying the user entity associated with the first node identifier; and
removing the user entity.

2. The method of using a cache of outgoing packet identifiers to recover from a protocol error of claim 1, wherein the first cache is dedicated to the traffic stream being sent to the first node.

3. The method of using a cache of outgoing packet identifiers to recover from a protocol error of claim 1, wherein the second cache is dedicated to the traffic stream being sent to the second node.

4. The method of using a cache of outgoing packet identifiers to recover from a protocol error of claim 1, wherein the first cache or the second cache is shared by a plurality of nodes.

5. The method of using a cache of outgoing packet identifiers to recover from a protocol error of claim 1, wherein each of a plurality of nodes has a separate cache.

6. The method of using a cache of outgoing packet identifiers to recover from a protocol error of claim 1, wherein the first cache or the second cache is a first-in-first-out cache.

7. A method of using a cache of outgoing packet identifiers to recover from a protocol error, comprising:
assigning a receive identifier associated with a user entity of a traffic stream at a receive node;
sending the receive identifier to a transmit node;
instructing the transmit node to associate the receive identifier with a receive plurality of data packets of the traffic stream;
assigning a transmit identifier associated with the user entity to the traffic stream at the transmit node;
storing the transmit node identifier, the receive node identifier, and the address of the receive node in a transmit cache at the transmit node for each of the receive plurality of data packets;
sending the receive plurality of data packets from the transmit node to the receive node;

receiving an error message at the transmit node from the receive node, indicating that the receive identifier was not recognized;

searching the transmit cache for the transmit node identifier using the receive node identifier and the address of the receive node;

identifying the user entity associated with the transmit node identifier; and removing the user entity.

8. The method of using a cache of outgoing packet identifiers to recover from a protocol error of claim 7, wherein the transmit cache is dedicated to the traffic stream being sent to the transmit node.

9. The method of using a cache of outgoing packet identifiers to recover from a protocol error of claim 7, wherein the transmit cache is shared by a plurality of nodes.

10. The method of using a cache of outgoing packet identifiers to recover from a protocol error of claim 9, wherein each of the plurality of nodes has a separate cache.

11. The method of using a cache of outgoing packet identifiers to recover from a protocol error of claim 7, wherein the transmit cache is a first-in-first-out cache.

12. An apparatus using a cache of outgoing packet identifiers to recover from a protocol error, comprising:

a receive node;

the receive node assigning a receive identifier associated with a user entity of a traffic stream, and sending the receive identifier to the transmit node;

the receive node instructing the transmit node to associate the receive identifier with a receive plurality of data packets of the traffic stream;

a transmit node having a transmit cache;

the transmit node assigning a transmit identifier associated with the user entity to the traffic stream;

the transmit node storing the transmit node identifier, the receive node identifier, and the address of the receive node in the transmit cache for each of the receive plurality of data packets;

the transmit node sending the receive plurality of data packets to the receive node;

the transmit node receiving an error message from the receive node, indicating that the receive identifier was not recognized;

the transmit node searching the transmit cache for the transmit node identifier using the receive node identifier and the address of the receive node;

the transmit node identifying the user entity associated with the transmit node identifier; and the transmit node removing the user entity from the transmit cache.

* * * * *